UNITED STATES PATENT OFFICE.

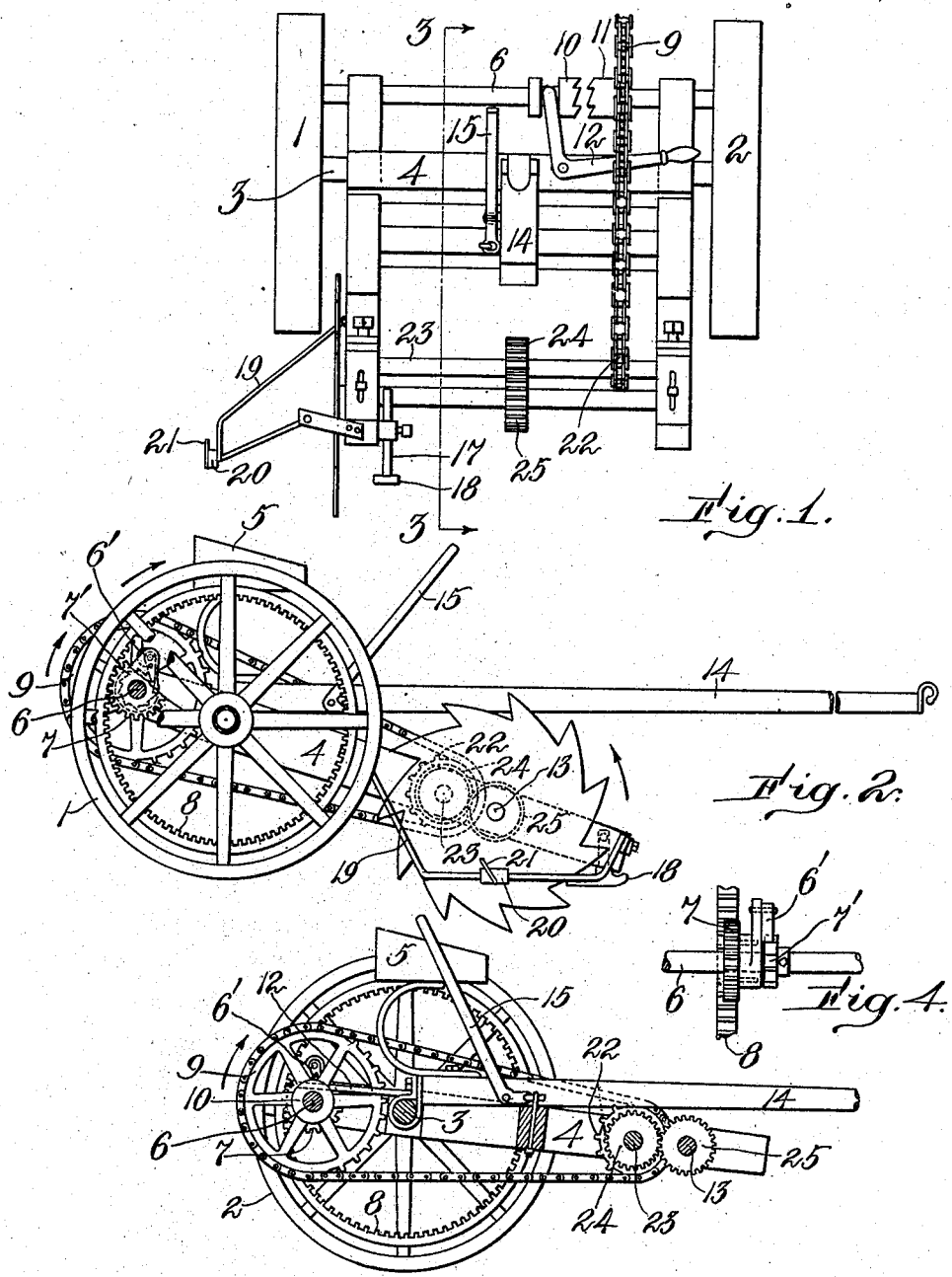

CHARLES GRANVILLE KIMBALL, OF WEST DERRY, NEW HAMPSHIRE.

ICE-CUTTER.

No. 900,933.      Specification of Letters Patent.      Patented Oct. 13, 1908.

Application filed October 24, 1906. Serial No. 340,267.

*To all whom it may concern:*

Be it known that I, CHARLES GRANVILLE KIMBALL, a citizen of the United States, residing at West Derry, in the county of Rockingham and State of New Hampshire, have invented certain new and useful Improvements in Ice-Cutters, of which the following is a specification.

In the harvesting of ice, to which my invention pertains it is of great importance that the ice be cut rapidly and evenly in order to assure the speedy gathering and handling of it during the continuance of suitable weather and in order to have it in economical form to prevent waste in shrinkage and storage. To provide for such cutting I have devised a machine which by a certain combination of parts to be more fully described hereinafter, saws the ice by power rapidly and evenly, to a predetermined depth, without being subject to the many difficulties formerly incident to the cutting operation.

In the specification which follows and in the drawings which form a part thereof, like letters of reference indicate corresponding parts throughout.

Figure 1 is a plan view of my machine, Fig. 2, a side view, Fig. 3, a side sectional view of Fig. 1, and Fig. 4 is a detail of one of the ratchets.

1 and 2 are wheels on an axle 3. 4 is a frame balanced to swing on said axle 3 and carrying thereover a seat 5. At the rear end of the frame is journaled a shaft 6 carrying at its ends pinions 7, having ratchet engagement with said shaft 6, said pinions 7 engaging an internal gear 8 on the wheels 2. Pawl 6 is carried on a hub attached to pinion 7 and engages the ratchet 7' on the shaft 6. 9 is a sprocket wheel loosely mounted on said shaft and 10 and 11 are clutch members for securing the sprocket to the shaft.

12 is a hand lever for moving the clutch member 10, which is splined to the shaft, into engagement with the clutch member 11 which is connected with the sprocket 9.

13 is a saw arbor journaled in the frame 4 carrying the saw 1.

14 is a tongue or pole hinged to the axle to allow it to swing independently of the frame 4.

15 is a lever pivoted to the tongue and having a bell crank end to raise and lower the forward end of the frame 4 to elevate the saw above the ice.

17 is an adjustable gage on the front end of the frame 4, having a runner shaped shoe 18 on its lower end which bears on the ice and slides thereon. The gage supports the frame and with it the saw at a predetermined distance above the ice, allowing the saw to make a cut of suitable depth.

19 are brackets hinged to the frame so as to rest upon the ice. At the point of contact with the ice they are provided with a shoe 20 in which is set a marking chisel 21.

22 is a sprocket near one end of a countershaft 23 and is connected with the sprocket 9 by the chain 16.

24 is a pinion on the countershaft 23, and 25 is an intermeshing pinion on the saw arbor 13.

In operation the gage 17 is set to give to the saw a suitable cut. The frame 4 is lowered by the lever 15 into position where the saw will enter the ice and being driven through the gears 8, 7 sprockets 9, 22 and chain 16, will rapidly cut into the ice as long as the machine is drawn along over it.

The saw is shown as arranged to be driven as an undercut but obviously the saw may be geared direct to the drive by omitting the countershaft 23 and driven as an over cut.

What I therefore claim and desire to secure by Letters Patent, is:—

1. In an ice cutter a pair of driving wheels and a connecting axle, a frame pivoted near its center to said axle, a shaft on one side of said frame, a driving connection between said wheels and shaft, a saw operatively mounted on said frame on the opposite side of said axle, means for driving the saw from the shaft, an independent draft pole connected to said axle, and means connecting said draft pole and frame for adjusting the frame relatively to the draft pole.

2. In an ice cutter, a pair of driving wheels and a connecting axle, gears on said driving wheels, a frame pivoted to said axle and having on one side of said axle a transverse shaft, pinions on said shaft and gearing with the gears on the driving wheels, a saw shaft journaled on said frame on the opposite side of said axle, means for driving the saw shaft from the pinion shaft, an independent draft
5 pole connected to said axle and means on said draft pole for vertically adjusting said saw frame relatively thereto.

In testimony whereof, I affix my signature in presence of two witnesses.

CHARLES GRANVILLE KIMBALL.

Witnesses:
　AGNES M. EATON,
　W. J. KINGSBURY.